(12) United States Patent
Gerig

(10) Patent No.: US 6,327,999 B1
(45) Date of Patent: *Dec. 11, 2001

(54) ELECTROSHOCK STIMULUS MONITORING METHOD AND APPARATUS

(75) Inventor: Duane A. Gerig, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/458,873

(22) Filed: Dec. 10, 1999

(51) Int. Cl.[7] .................................................. A07K 37/00

(52) U.S. Cl. ............................................................ 119/712

(58) Field of Search ..................... 119/720, 721, 119/712; 340/573.3

(56) References Cited

U.S. PATENT DOCUMENTS

| 5,435,271 | | 7/1995 | Touchton et al. ..................... 119/721 |
| 5,666,908 | * | 9/1997 | So ........................................ 119/720 |
| 6,184,790 | * | 2/2001 | Gerig ................................. 340/573.3 |

* cited by examiner

Primary Examiner—Charles T. Jordan
Assistant Examiner—Jordan M Lofdahl
(74) Attorney, Agent, or Firm—Taylor & Aust, P.C.

(57) ABSTRACT

In a method of applying an electrical stimulus to an animal, at least one electrode is in contact with the animal and is fixedly and electrically coupled with a voltage detector circuit. A stimulus signal is carried by the at least one electrode. Using the voltage detector circuit, it is determined whether the stimulus signal exceeds a predetermined voltage level. An indicator signal, indicative of the determining step, is transmitted from the voltage detector circuit.

24 Claims, 4 Drawing Sheets

ELECTROSHOCK STIMULUS MONITORING METHOD AND APPARATUS

BACKGROUND OF THE INVENTION

1. Field of the Invention

The present invention relates to animal behavior modification systems, and, more particularly, animal behavior modification systems which apply an electrical shock to an animal.

2. Description of the Related Art

Animals such as dogs may be fitted with a collar which carries a receiver unit and a pair of electrodes for applying electrical stimulation to the skin of the dog in order to control its behavior. For example, a conventional pet containment system includes a stationary transmitter which is connected to an endless wire placed around the confinement area under the surface of the ground. Over the endless wire, the stationary transmitter transmits a radio frequency(RF) signal which is received by the receiver unit if the dog approaches too close to the wire. In response to receiving the signal, a voltage is applied across the electrodes, which causes an electrical current to flow through the dog's skin between the two electrodes. Alternatively, the trainer may carry a portable transmitter which selectively transmits an RF signal to the receiver unit for electrical stimulation when the animal exhibits undesirable behavior. As another option, a stationary transmitter may transmit an RF signal which is received by the receiver so long as the dog is in the confinement area. If the dog strays from the confinement area, the RF signal is no longer received and electrical stimulation is applied to the dog through the electrodes.

A problem is that the animal owner sometimes incorrectly installs the electroshock device on the animal so that the electroshock contacts do not make adequate contact with the animal's skin. More particularly, the collar is often not tightened enough so that the electrodes may be sufficiently biased against the animal's skin. As a result, the electroshock corrections that are generated by the device either are not detected by the animal or have a minimal effect on the animal and fail to provide the necessary correction. In other cases, the electroshock device is malfunctioning, for various reasons, and is not capable of producing an adequate electroshock correction, even when correctly installed.

It is known for the user to connect an audible or visible device to the output electrodes in order to determine whether an electroshock stimulus output is being generated. The user places the device in an environment capable of producing an electroshock stimulus output and watches or listens for the output to occur. A problem is that there is no indication of magnitude of the output level; the audible or visible device only indicates the presence or absence of the output. Thus, there is no indication of whether an adequate electroshock stimulus is being applied to the animal as installed, or whether the electroshock device is capable of producing an adequate electroshock stimulus, even when the electroshock device is correctly installed.

What is needed in the art is a device which allows the user to verify that the electroshock device is operating correctly, and that the electroshock device is installed correctly such that it may apply an adequate electroshock correction to the animal.

SUMMARY OF THE INVENTION

The present invention provides a method and apparatus which allows the animal owner to verify that the collar is correctly installed by performing an installation test which determines whether the electroshock probes are making proper contact with the animal's skin. The user may also perform a self test, with the electroshock device removed from the animal, to verify that the electroshock device is capable of providing an acceptable stimulation level.

The invention comprises, in one form thereof, a method of applying an electrical stimulus to an animal. At least one electrode is in contact with the animal and is fixedly and electrically coupled with a voltage detector circuit. A stimulus signal is carried by the at least one electrode. Using the voltage detector circuit, it is determined whether the stimulus signal exceeds a predetermined voltage level. An indicator signal, indicative of the determining step, is transmitted from the voltage detector circuit.

An advantage of the present invention is that the user is able to perform a functional self test of the electroshock device and measure whether the output level is within specified limits without the need for attaching additional external indicator devices.

Another advantage is that, while the electroshock device is being worn by the animal, the self test may be performed to verify that the device has been properly installed.

Yet another advantage is that data relating to the output level of the electroshock device may be stored in a memory for later analysis.

A further advantage is that the electroshock stimulus applied to the animal may be continually monitored or stored in a memory for later analysis so that the user can determine the number of times a correction stimulus has been performed, the time interval between shocks, the voltage level of the applied shocks, and whether the correction stimulus was properly applied to the animal's skin.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
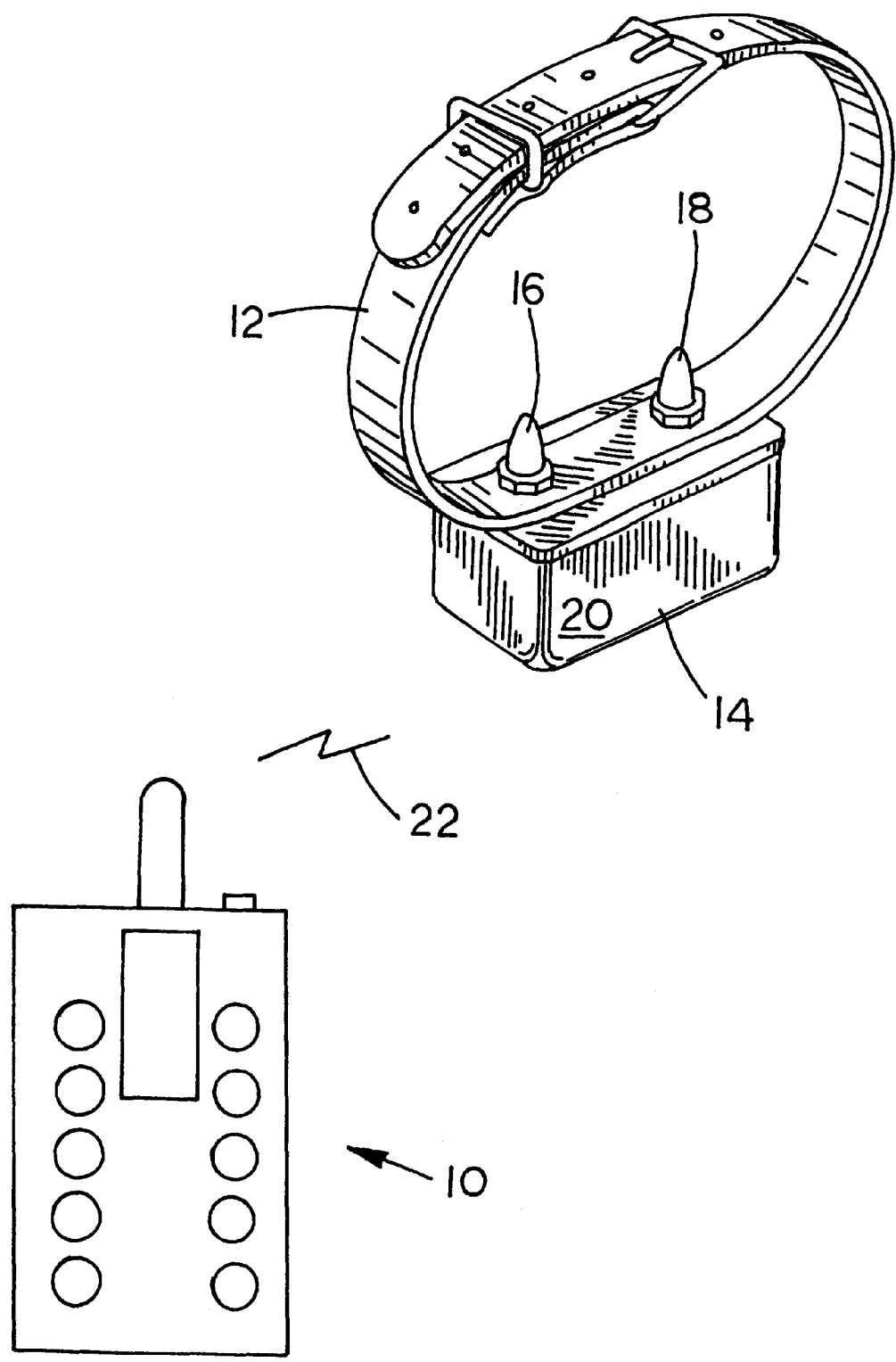
FIG. 1 is a perspective view of a transmitter and one embodiment of a receiver/transmitter unit of the present invention.
Figure 2:
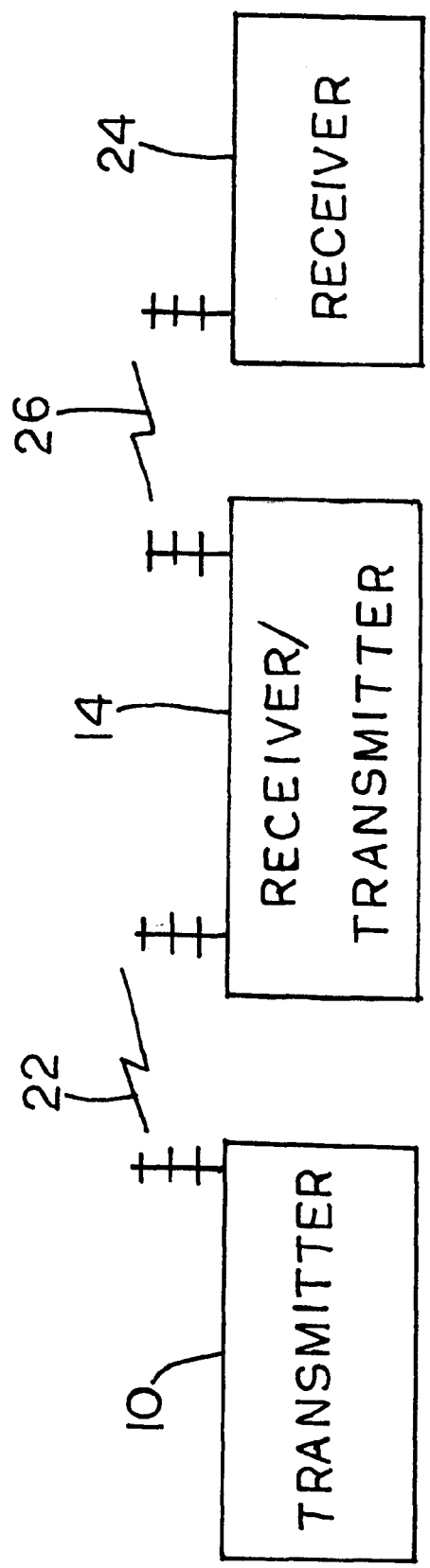
FIG. 2 is a block diagram of the transmitter and receiver/transmitter of FIG. 1 coupled with a receiver unit.

Referring now to the drawings and particularly to FIG. 1, there is shown an animal behavior modification system including a transmitter 10 and an animal shock collar 12 carrying one embodiment of a remote receiver/transmitter unit 14 of the present invention. Remote receiver/transmitter unit 14 includes at least two probes or electrodes 16 and 18 projecting from a hermetically sealed box 20. Receiver/transmitter 14 receives a transmitted signal, indicated at 22, from transmitter 10. An optional receiver unit 24 (FIG. 2) receives a second transmitted signal, indicated at 26, from receiver/transmitter 14.

Within box 20 is contained a receiver circuit 28 which receives signal 22 from transmitter 10. Receiver/transmitter 14 also includes a signal generator 30, an input circuit 32, and a voltage detector circuit 33 which includes a voltage divider circuit 34, a pulse stretcher circuit 36, a voltage comparator 38, and a microcontroller 40. Lastly, receiver/transmitter 14 includes a transmitting circuit 42 and a light emitting diode (LED) 44.

Signal generator 30 is capable of generating a number of different input signals, one of which may be selected by the user depending on the intensity of the stimulus signal that the user wishes electrodes 16 and 18 to apply to the animal. For example, the user may operate a switch (not shown) to select one of seven different input signals which each have a different pulse duration which generates a different output voltage at electrodes 16 and 18. In general, the shorter the pulse width, the lower the voltage level of the output signal. In one embodiment, the pulse width may range from 20 to 1000 microseconds, and the output voltage at electrodes 16 and 18 may range between 100 and 2000 volts. The input signal transmitted by signal generator 30 to input circuit 32 typically is a pulse having a time duration of less than 1 millisecond.

Input circuit 32 includes a transistor 46 and a transformer 48. As signal generator 30 applies the input signal to the base of transistor 46, current flows through primary winding 50, thereby inducing a second current in secondary winding 52. The voltage signal across secondary winding 52 provides a stimulus signal that is applied across electrodes 16, 18.

Figure 3:
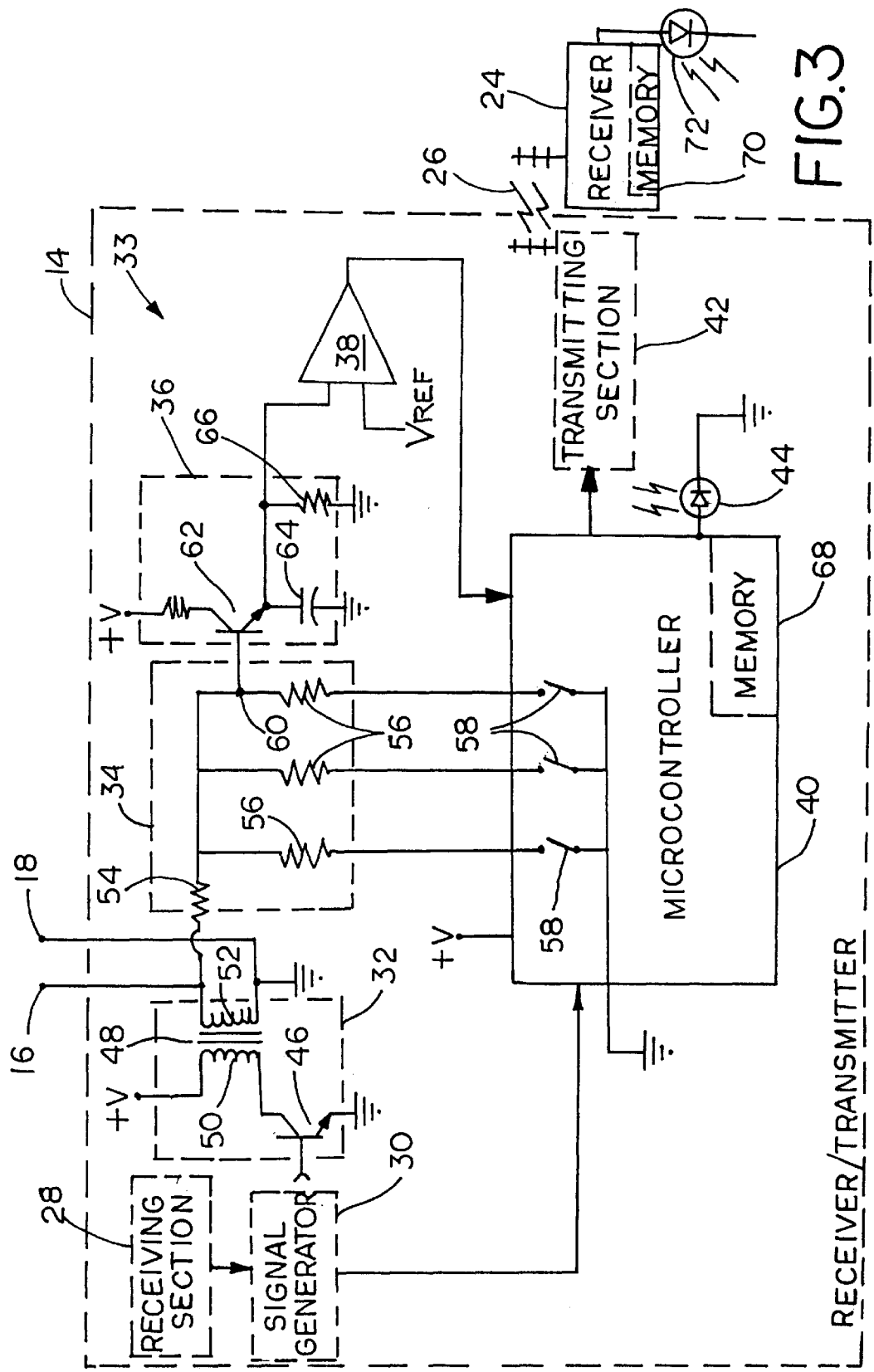
FIG. 3 is a schematic diagram of the receiver/transmitter and receiver of FIG. 2.

Voltage divider circuit 34 includes a high value fixed resistor 54 and one or more parallel measurement resistors 56, with three measurement resistors 56 being shown in the embodiment of FIG. 3. The peak voltage of the stimulus signal across electrodes 16, 18 can be between approximately 1000 and 4000 volts, and preferably is between 1000 and 2000 volts. Voltage divider circuit 34 functions to reduce this voltage to a level that can be more easily measured and/or compared, such as between approximately one and five volts. By operating internal switches 58, microcontroller 40 can select and combine measurement resistors 56 in order to determine the percentage by which the voltage of the stimulus signal is reduced at node 60. Each of the possible combinations of measurement resistors 56 produces a different signal at node 60, and each signal represents a respective percentage reduction of the stimulus signal at electrodes 16, 18. Microcontroller 40 can select a combination of measurement resistors 56 that corresponds with the input signal selected by the user from signal generator 30 such that the peak voltage seen at node 60 is substantially constant regardless of which input signal has been chosen. If the total number of measurement resistors 56 is N, measurement resistors 56 can be combined in $2^N-N1$ different ways. Thus, the three measurement resistors 56 shown in FIG. 3 can be combined in seven different ways, with each way corresponding to one of seven possible input signals to be chosen by the user. Microcontroller 40 can also select a combination of measurement resistors 56 based upon whether electrodes 16, 18 are loaded by the skin of the animal, i.e., whether collar 12 is being worn by the animal.

Voltage divider circuit 34 provides a high impedance test load for the high voltage output transformer 48 when electrodes 16, 18 are not in contact with an animal. Voltage divider circuit 34 is also designed to minimize any loading effects when an electroshock stimulus is applied to the animal through electrodes 16, 18. The resistor values that are used in voltage divider circuit 34 are a function of the high voltage transformer 48 used to generate the electroshock stimulus, the desired load required to make the open circuit high voltage measurement, the high voltage present on transformer 48 when the electroshock stimulus is applied to animal skin, and the threshold voltage range capabilities of voltage comparator 38.

The stimulus signal that appears at electrodes 16, 18 in response to an input signal from signal generator 30 has a voltage waveform that spikes up to a peak value and then exponentially decays relatively quickly. That is, the waveform has a relatively short decay time. The time period in which the waveform is at or near its peak voltage level may be too short for the peak value to be easily measured. Pulse stretcher circuit 36, using the reduced stimulus signal at node 60 as an input, produces a modified signal which has a longer decay time, or slower exponential decay, than the reduced stimulus signal at node 60. Pulse stretcher circuit 36 includes a transistor 62 in a voltage follower configuration with a capacitor 64 and a resistor 66 attached to the emitter. The RC circuit has a time constant that is long enough to allow required measurements of the short duration high voltage output pulses. That is, the modified signal produced by pulse stretcher circuit 36 remains at or near its peak value for a period of time sufficient for the peak value to be easily measured.

Voltage comparator 38 compares the peak value of the modified signal produced by pulse stretcher circuit 36 to a threshold voltage $V_{ref}$. $V_{ref}$ may be supplied by microcontroller 40, or by a voltage divider or amplifier connected to +V. Microcontroller 40 determines if the output response of comparator 38 is proper for the input signal generated by signal generator 30 in order to determine whether receiver/transmitter 14 is operating correctly and/or collar 12 is correctly installed on the animal.

The user can indicate to controller 40, possibly by use of a switch (not shown), whether the device is being tested in the unloaded state, i.e., off of the animal, or in the loaded state, i.e., on the animal. The test may be initiated by either an airborne signal transmitted by transmitter 10 or by a test signal induced by the user via a switch (not shown) on box 20.

If collar 12 has been correctly installed on the animal so that electrodes 16, 18 are in good electrical contact with the animal's skin, the peak value of the voltage signal at electrodes 16, 18 should be only approximately ⅓ of its value in the unloaded state. In one embodiment, this maximum voltage value in the loaded state has been empirically found to be approximately 800 volts. Thus, if the user has indicated that a test is being conducted with collar 12 on the animal, voltage comparator 38 compares the signal to a first threshold value $V_{ref}$. If the peak value of the digital signal exceeds this first threshold value, it is indicative that electrodes 16, 18 are not making good electrical contact with the animal's skin. Microcontroller 40 then transmits an indicator signal to light emitting diode (LED) 44 in order to visually indicate to the user that collar 12 is not properly installed. For example, the indicator signal could cause LED 44 to flash on and off continuously. Upon seeing the flashing signal on LED 44, the user can tighten collar 12 in order to increase the pressure with which electrodes 16, 18 are biased against the animal's skin. The test can then be repeated in the loaded state in order to verify that collar 12 is sufficiently tight.

If, on the other hand, the user has indicated to microcontroller 40 that the test is being conducted in the unloaded state with collar 12 off of the animal, then voltage comparator 38 compares the signal to a second threshold value $V_{ref}$ which is higher than the first threshold value. If voltage comparator 38 determines that the signal is less than the second threshold value, it is indicative that receiver/transmitter 14 is malfunctioning and is not capable of producing an adequate stimulus signal across electrodes 16, 18. Microcontroller 40, in this mode too, transmits an indicator signal to LED 44 to indicate to the user that receiver/transmitter 14 is malfunctioning. For example, the indicator signal in this mode could cause LED 44 to flash on and off with a frequency that is different from the flashing frequency in the loaded test mode.

Data related to the signal from voltage comparator 38 may be stored in a memory 68, which may be either in microcontroller 40 or in a separate memory device connected to microcontroller 40. This data storage may be particularly useful when receiver/transmitter 14 is being operated in the field, rather than being in one of the two test modes. For instance, the data stored in memory 68 may be later analyzed in order to determine the number, frequency and intensity of the shocks which have been applied to the animal.

Data related to the signal from voltage comparator 38, or the digital signal itself, can be transmitted to receiver 24 from transmitting circuit 42 through a RF link. Receiver 24 includes a memory 70 which is capable of performing the same functions as memory 68. Receiver 24 can also include a microcontroller to perform the measuring and/or comparing of the digital signal. The indicator signal that is transmitted to LED 44 can also be transmitted to receiver 24 in order to be displayed on a LED 72 connected thereto. Receiver 24 can be separate from transmitter 10, as shown, or can be integral with transmitter 10.

Indicator devices 44 and 72 are shown as being in the form of LED's. However, indicator devices 44, 72 may also be audible devices, alpha/numeric displays, or any other type of device which indicates to the user that the output voltage is either within or outside of predetermined threshold limits. Receiver/transmitter 14 and receiver 24 are shown as communicating through a RF link. However, it is to be understood that they may also communicate through an acoustic data link, a magnetic data link, or an optic data link. For example, the data related to the digital signal may be transmitted via LED 44 to an optical receiver on receiver 24. In this embodiment, receiver 24 may be part of a base unit that inductively recharges a battery within receiver/transmitter 14. The battery supplies +V throughout receiver/transmitter 14. The relatively close engagement between receiver/transmitter 14 and receiver 24 that is required for such inductive recharging is also particularly conducive for optical data transfer, such as through LED 44.

In the embodiment described above, the amplitude of $V_{ref}$ depends upon whether the user indicates that collar 12 is or is not being worn by the animal. In another embodiment, $V_{ref}$ has a constant voltage amplitude regardless of whether collar 12 is being worn by the animal. In order to compensate for the effects of loading on the signal at electrode 16, 18, microcontroller 40 selects one of two combinations of measurement resistors 56, with the combination that is selected being dependent upon whether collar 12 is being worn by the animal. The two combinations of measurement resistors 56 are predetermined such that, with receiver/transmitter 14 operating properly, the voltage at node 60 when electrodes 16, 18 are unloaded is higher than the $V_{ref}$ voltage and when electrodes 16, 18 are properly biased against the animal's skin the voltage at node 60 is lower than the $V_{ref}$ voltage. Thus, regardless of whether electrodes 16, 18 are loaded, voltage comparator 38 can compare its input voltage to a same value of $V_{ref}$.

Figure 4:
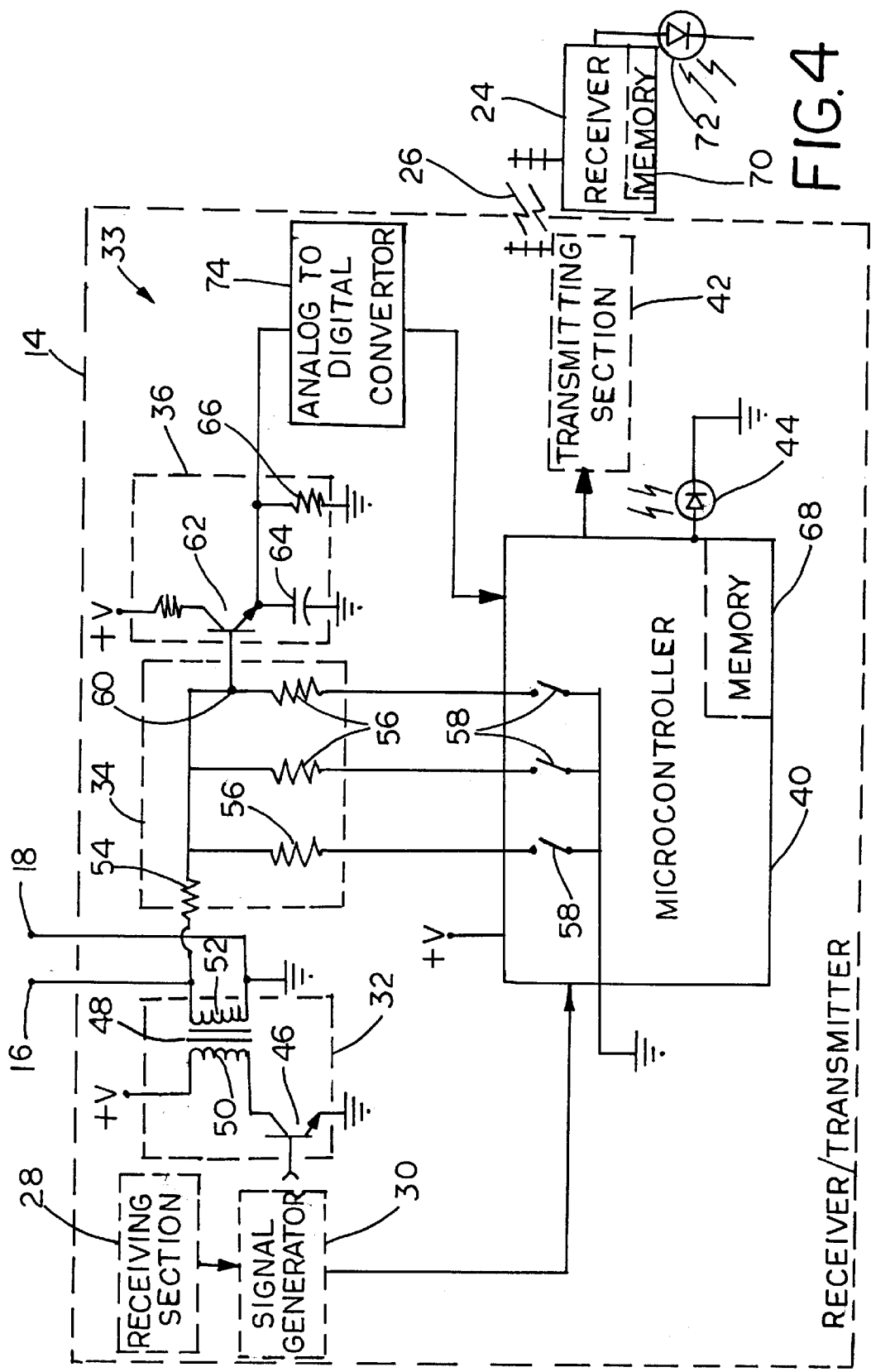
FIG. 4 is a schematic diagram of another embodiment of a receiver/transmitter unit of the present invention.

In another embodiment (FIG. 4), microcontroller 40 is capable of directly measuring the digital signal from an A/D converter 74, and measurement resistors 56 may be eliminated or shorted out.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of applying an electrical stimulus to an animal, said method comprising the steps of:

providing at least one electrode configured for being in contact with the animal, said at least one electrode being fixedly and electrically coupled with a voltage detector circuit;

causing a stimulus signal to be carried by said at least one electrode; and determining, using said voltage detector circuit, whether said stimulus signal exceeds a predetermined voltage level.

2. The method of claim 1, comprising the further step of maintaining said at least one electrode in contact with the animal during said applying and determining steps.

3. The method of claim 2, wherein said maintaining step includes engaging said at least one electrode with the skin of the animal, and if said stimulus signal exceeds said predetermined voltage level, increasing a pressure with which said at least one electrode is biased against the skin of the animal.

4. The method of claim 1, wherein said stimulus signal comprises an analog voltage signal, said method comprising the further steps of:

converting said analog signal to a digital signal; and transmitting said digital signal to a microcontroller.

5. The method of claim 4, comprising the further step of storing data dependent upon said digital signal in a memory.

6. The method of claim 1, wherein said causing step includes:

coupling an input circuit to said at least one electrode; and applying an input signal to said input circuit, said input signal comprising a pulse having a time duration of less than approximately 1.0 millisecond;

said stimulus signal having a peak voltage value and a first decay time, said voltage detector circuit producing a modified signal dependent upon said stimulus signal and having a second decay time, said second decay time being longer than said first decay time.

7. The method of claim 6, wherein said applying step includes:

providing a signal generator configured for generating a plurality of input signals;

selecting one of said input signals; and generating said selected input signal with said signal generator;

said determining step including:
  reducing said stimulus signal by a selected one of a plurality of predetermined percentages, said selected predetermined percentage corresponding to said selected input signal; and
  comparing said reduced stimulus signal to said predetermined voltage level.

8. The method of claim 1, wherein said predetermined voltage level comprises an empirically-found maximum voltage level of said stimulus signal when said stimulus signal is properly applied to the animal.

9. The method of claim 8, wherein said predetermined voltage level is approximately 800 volts.

10. The method of claim 1, wherein said predetermined voltage level comprises an empirically-found minimum voltage level of said stimulus signal when said at least one electrode is not in contact with the animal.

11. The method of claim 10, wherein said predetermined voltage level is approximately between 1000 and 4000 volts.

12. The method of claim 1, comprising the further step of transmitting an indicator signal from said voltage detector circuit, said indicator signal being indicative of said determining step.

13. An apparatus for modifying the behavior of an animal, said apparatus comprising:
  at least one electrode configured for being in contact with the animal;
  a receiver circuit electrically connected to said at least one electrode, said receiver circuit being configured for causing a stimulus signal to be carried by said at least one electrode dependent upon a received signal; and
  a voltage detector circuit configured for determining whether said stimulus signal exceeds a predetermined voltage level and transmitting an indicator signal dependent upon whether said stimulus signal exceeds said predetermined voltage level.

14. The apparatus of claim 13, wherein said received signal comprises at least one of an air-borne signal and a test signal induced by a user.

15. The apparatus of claim 13, wherein said voltage detector circuit includes:
  an analog-to-digital converter configured for converting said stimulus signal into a digital signal; and
  a microcontroller receiving said digital signal and transmitting said indicator signal dependent upon said digital signal.

16. The apparatus of claim 15, further comprising an indicator device receiving said indicator signal and providing an indication thereof, said indicator device comprising at least one of an audible indicator device and a visible indicator device.

17. The apparatus of claim 15, further comprising a memory device storing said digital signal.

18. The apparatus of claim 13, wherein said voltage detector circuit includes a voltage divider circuit configured for reducing said stimulus signal by a predetermined percentage.

19. The apparatus of claim 18, further comprising an input circuit electrically coupled between said receiver circuit and said at least one electrode, said receiver circuit transmitting one of a plurality of user-selectable input signals to said input circuit, said voltage divider circuit being configured for reducing said stimulus signal by a selected one of a plurality of predetermined percentages, said selected predetermined percentage being dependent upon said user-selected input signal.

20. The apparatus of claim 18, wherein said reduced stimulus signal has a first decay time, said voltage detector circuit including a pulse stretcher circuit producing a modified signal dependent upon said reduced stimulus signal and having a second decay time, said second decay time being longer than said first decay time.

21. The apparatus of claim 13, wherein said voltage detector circuit is fixedly and electrically coupled with said at least one electrode.

22. An apparatus for modifying the behavior of an animal, said apparatus comprising:
  a transmitter configured for transmitting a first transmitted signal;
  a receiver/transmitter configured for receiving said first transmitted signal and applying an electrical stimulus signal to the animal dependent upon said first transmitted signal, said receiver/transmitter including:
    a voltage detector circuit configured for producing an indicator signal, said indicator signal being indicative of a voltage level of at least one said stimulus signal; and
    a transmitting circuit receiving said indicator signal and transmitting a second transmitted signal dependent upon said indicator signal; and
  a receiver circuit configured for receiving said second transmitted signal.

23. The apparatus of claim 22, wherein said indicator signal is indicative of whether said receiver/transmitter is correctly installed on the animal.

24. The apparatus of claim 22, wherein each of said first transmitted signal and said second transmitted signal comprises an air-borne signal.

* * * * *

UNITED STATES PATENT AND TRADEMARK OFFICE
CERTIFICATE OF CORRECTION

PATENT NO.   : 6,327,999 B1
DATED        : December 11, 2001
INVENTOR(S)  : Duane A. Gerig It is certified that error appears in the above-identified patent and that said Letters Patent is hereby corrected as shown below:

<u>Column 3,</u>
Line 58, delete "-N1" and substitute -- -1 -- therefor.

Signed and Sealed this

Twenty-ninth Day of April, 2003

JAMES E. ROGAN
*Director of the United States Patent and Trademark Office*